Dec. 20, 1932. A. B. CHANCE Re. 18,697

EARTH ANCHOR

Original Filed May 26, 1928 2 Sheets-Sheet 1

Inventor:
Albert B. Chance.
By Williams, Bradbury, McCaleb & Hinkle.
Attys.

Dec. 20, 1932. A. B. CHANCE Re. 18,697

EARTH ANCHOR

Original Filed May 26, 1928 2 Sheets-Sheet 2

Inventor
Albert B. Chance

By Williams, Bradbury, McCaleb & Hinkle
Attys.

Reissued Dec. 20, 1932

Re. 18,697

UNITED STATES PATENT OFFICE

ALBERT B. CHANCE, OF CENTRALIA, MISSOURI

EARTH ANCHOR

Original No. 1,786,228, dated December 23, 1930, Serial No. 280,699, filed May 26, 1928. Application for reissue filed January 23, 1932. Serial No. 588,452.

The present invention relates to earth anchors, and is particularly concerned with earth anchors of the expansible type.

One of the objects of the present invention is the provision of an improved commercial form of the expansible anchor shown in United States Patent No. 1,546,327, issued July 14, 1925, to Herbert M. Taylor and Frank Sutcliffe, and by them assigned to me.

Another object of the invention is the provision of an improved expanding anchor which is more quickly and economically manufactured and assembled than the anchors of the prior art, and which is capable of withstanding greater strains and abuse than the prior anchors.

Another object of the invention is the provision of an improved construction for the expanding anchors of the class described, which includes a housing for enclosing and guiding the slidable flukes and improved forms of toggle arms and cross-heads, which are stronger and more easily manufactured and assembled than the parts of the anchors shown in the prior art.

Another object of the invention is the provision of an extremely simple and economical form of the expanding anchor above mentioned, from which all complicated parts have been eliminated and in which the number of separate parts has been reduced to a minimum, thereby decreasing the cost of manufacture.

Another object of the invention is the provision of an improved cross-head structure for earth anchors and the like having an improved mode of pivotally mounting levers or other members upon the cross-head in such manner as to better withstand the excessive strain placed upon such pivotal mountings.

Another object is the provision of an improved earth anchor having an improved cross-head and improved pivotal mountings for the levers on the cross-head in order to eliminate the difficulties encountered with the pivotal mountings of the prior art, the rivets of which were frequently sheared off during the tamping on the cross-head to expand the anchor.

Other objects and advantages of the invention will appear more fully from the following description and from the accompanying drawings, in which similar characters of reference indicate similar parts throughout the several views.

Referring to the drawings, of which there are three sheets,

Figure 1:
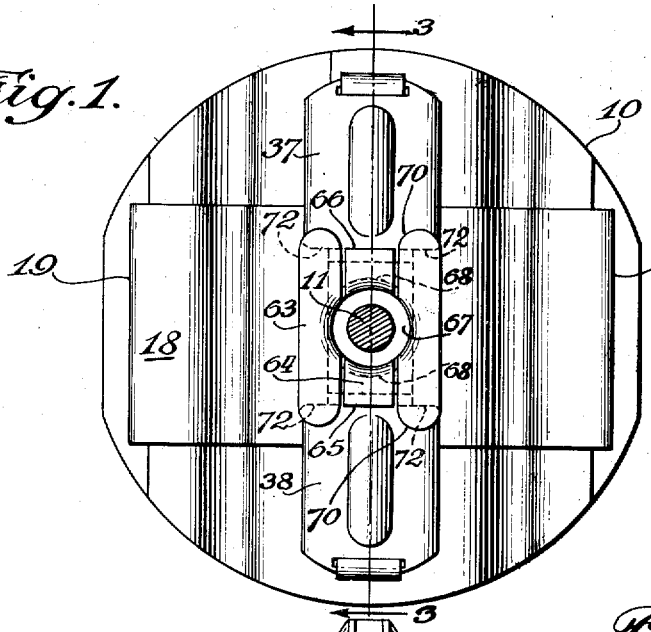
Fig. 1 is a top plan view of my improved expanding anchor.
Figure 5:
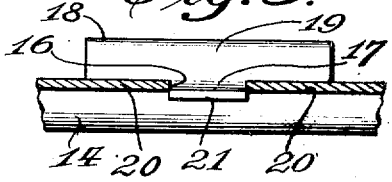
Fig. 5 is an elevational cross sectional view taken on the line 5—5 of Fig. 2.

Referring to Figs. 1 to 4, 10 indicates in its entirety, my anchor which is adapted to be secured to a guy rod 11 having an eye 12 adapted to receive a cable and provided with a threaded end 13. The anchor is preferably provided with a bottom plate 14 which may be of any shape, but which is preferably of substantially circular form, in order to conform to the shape of holes dug by the usual methods.

The bottom or washer plate 14 is provided with a centrally located aperture 15 adapted to receive the guy rod 11 and with a pair of elongated slots or apertures 16 which are adapted to receive flanges 17 upon a housing member 18.

The housing or crown member 18 comprises a substantially rectangular piece of sheet metal having a downwardly turned flange 19 at each end, which may have an extension 17 of less width forming shoulders 20 on each side of the extension flange 17 for engagement with the body of the bottom plate 14.

The bottom plate or washer plate 14 cooperates with the crown member or housing member 18 to guide the flukes from above and from below, and these plates are particularly efficacious in strengthening the anchor structure and supporting the flukes in proper position when the flukes are fully extended, because there is only a relatively small area of each fluke in engagement with the other fluke when the anchor is fully extended.

The extension flanges 17 pass through the elongated slots or apertures 16 in the bottom plate 14 and are bent over as at 21, thereby permanently assembling these parts. The housing member 18 is also provided with an aperture 22 in substantial alignment with the aperture 15 in the bottom plate.

In order to provide means whereby the nut 23 may be held so that the guy rod 11 may be removed when the anchor is in place in the earth, and to provide means whereby the guy rod may be driven into the earth when it is desired to abandon the entire anchor, I provide my bottom plate with a pair of sheet metal members 24 which are adapted to secure the nut 23 against rotation, and which are also adapted to be bent apart to release the nut when a blow is delivered by a sledge or other driving means at the eye of the guy rod.

The members 24 may comprise strips of sheet metal, each having an attaching flange 25, a flange 26 extending at right angles to said attaching flange and a retaining flange 27 substantially parallel to the attaching flange. The retaining flanges may be formed with substantially semi-circular grooves 28 so that they are adapted to encircle the guy rod 11.

The flanges 25 may be secured to the bottom plate by spot welding as at 29 and the flanges 24 are adapted to secure the nut against rotation so that the guy rod may be removed even after the anchor is embedded in the earth. The subject-matter of this releasing device is described and claimed in my Patent 1,755,811 of April 22, 1930, and will not therefore be claimed in the present application.

Slidably mounted within the housing, provided by the housing member 18 and the bottom plate 14, are a pair of flukes 30 and 31, and the flukes 30 and 31 may be formed of substantially rectangular sheets of metal having rounded ends as at 32 and 33. In order to maintain the flukes in aligned position and to provide their sliding movement transversely to the guy rod 11, the flukes are preferably each provided with an elongated slot 34 extending from one end to such a point past the center of the anchor, that both flukes may embrace the guy rod 11.

Figure 4:
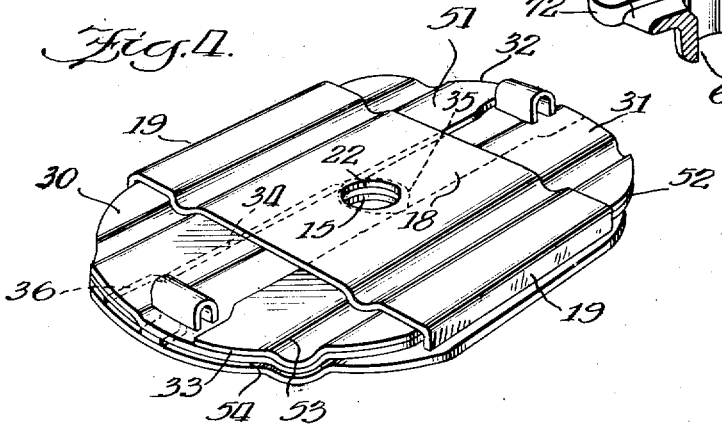
Fig. 4 is a view in perspective of the housing and flukes.

The ends of the slots 24 may be rounded as at 35 so that when the flukes are in the position shown in Fig. 4, a substantially circular aperture is provided which is aligned with the apertures 15 and 22 in the bottom plate and housing member. The slots 34 may be slightly widened as at 36 to provide more room for the toggle links 37 and 38, and the clips 39 and 40.

Figure 2:
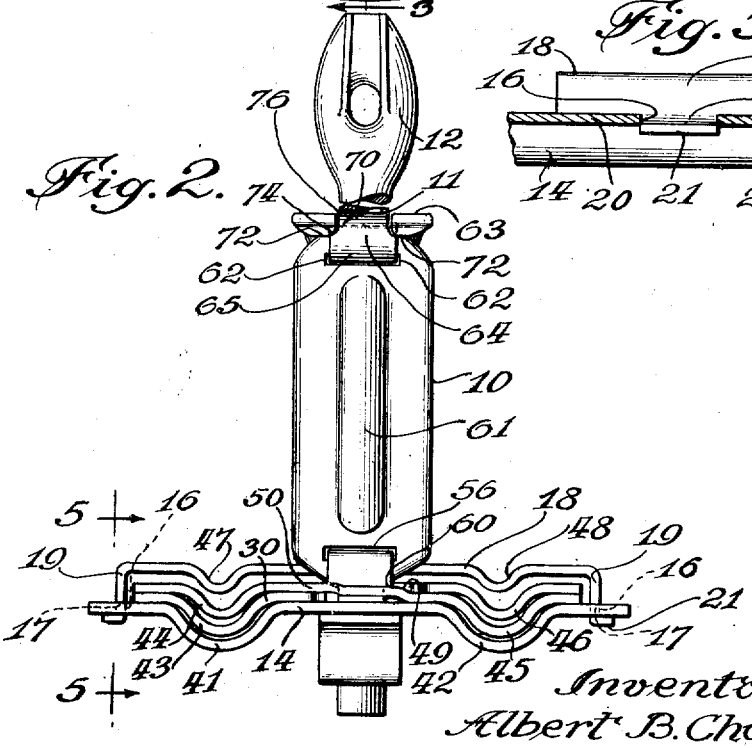
Fig. 2 is a side elevational view of the same.
Figure 3:
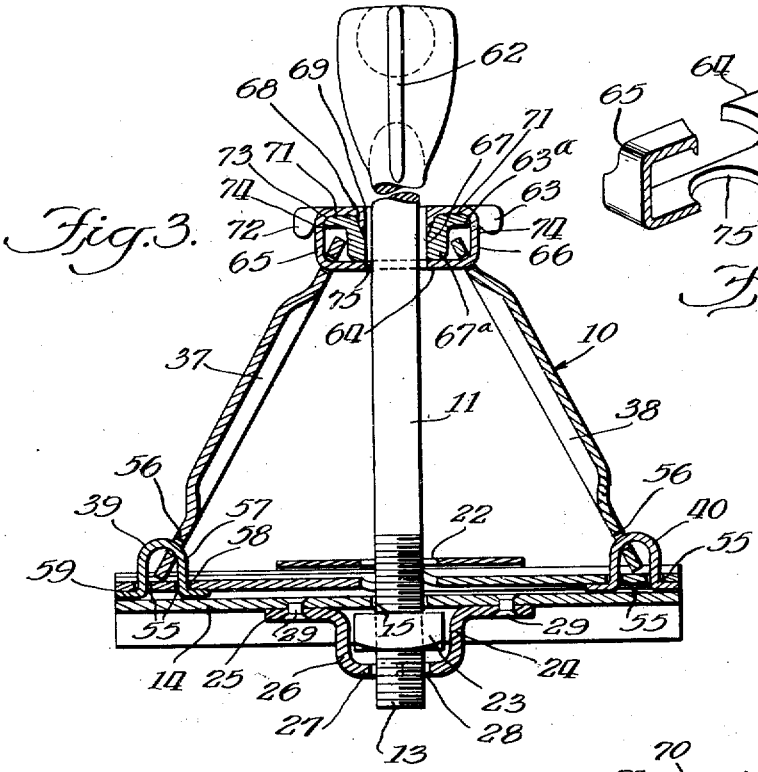
Fig. 3 is a medial, cross sectional, elevational view taken on the line 3—3 of Fig. 1.
Figure 6:
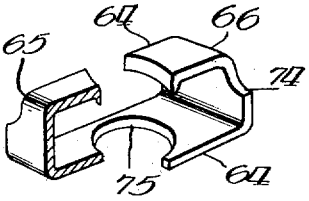
Fig. 6 is a view in perspective, in partial section, of the strip for pivoting the links on the crosshead.
Figure 7:
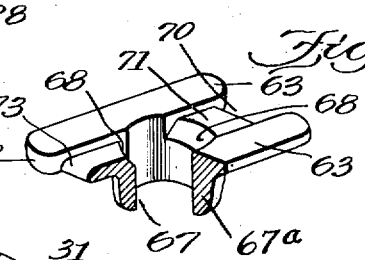
Fig. 7 is a view in perspective, in partial section, of the crosshead.

Referring to Fig. 2, it will be observed that the bottom plate 14 is provided with a pair of transversely extending corrugations 41 and 42 which are adapted to greatly reinforce this member and to increase the strength of the anchor as a whole. The flukes 30 and 31 are likewise formed with corrugations 43, 44, 45 and 46 of a size adapted to nest with each other, and within the corrugations 41 provided by the bottom plate. The housing member 18 is likewise provided with corrugations 47 and 48 of smaller size adapted to be complementary to the inner part of the corrugation 44 and 46 of the flukes 30 and 31.

In order that the flukes may be guided by each other as well as by the housing, the flukes are provided with offset portions 49 and 50 in such manner that they may be crossed at their center portions, each having a leg extending below a leg on the other fluke. Thus it will be observed that the leg 51 of the fluke 30 extends above the body of the fluke 31, while the leg 52 on the fluke 30 extends below the body of the fluke 31. In a similar manner the leg 53 on the fluke 31 extends above the body of the fluke 30, while the leg 54 upon the fluke 31 extends below the body of the fluke 30.

It should also be noted that this crossing of the flukes renders it necessary that corrugations on opposite sides of the fluke be of different size in order that the corrugations may nest with each other and with the corrugations in the bottom plate 14. Thus, in Fig. 2, the fluke 30 is provided with a corrugation at the left side which is adapted to nest within the corrugation 43 of the other fluke, and the corrugation 44 is therefore third in size.

The corrugation 45 of the fluke 30 is second in size, being adapted to nest with the corrugation 42 of the bottom plate and the corrugation 46 of the fluke 31. The corrugation 46 of the fluke 31 is third in size, and the corrugation 43 of the same fluke is second in size.

It will thus be observed that both the housing and the flukes are provided with complementary corrugations which are adapted to permit sliding movement between the flukes and the housing and to retain these members in their proper position, although the flukes be extended to a maximum amount, and furthermore, the corrugations greatly increase the strength of the anchor as a whole.

The flukes 30 and 31 are each provided at their ends with a pair of elongated slots 55 which are adapted to receive the legs of the clips 39 and 40, which pivotally secure the flukes to the toggle links 37 and 38. The clips 39 and 40 comprise strips of sheet metal bent to substantially U-shape and passing through elongated apertures 56 in the links 37 and 38.

The legs 57 of the clips 39 and 40 may be provided with narrower portions 58 adapted to be received in the slots 55, and when the legs of the clips are inserted in the slots 55 and bent over as at 59, the clips are substantially riveted to the flukes between the ends 59 and the shoulders 60 upon the clips.

The links 37 and 38 comprise substantially flat strips of metal such as steel, having formed therein a longitudinally extending rib 61, the rib terminating short of the elongated apertures 56 and 62 at each end of the links.

The links 37 and 38 are also pivotally connected to a crosshead 63 by means of a sheet metal member 64 having a pair of arms 65 and 66 which pass through the apertures 62 of the links.

The crosshead 63 comprises a cast metal member having a central bore 67 surrounded by collar 67A of sufficient size to slidably receive the guy rod 11, the bore 67 being slightly enlarged at the top 68 to permit the arm 65 of the metal member 64 to be bent down into the bore as at 69. The crosshead 63 is preferably formed with a laterally projecting flange 63A having slots 70 at opposite sides and the slots 70 communicate with grooves 71 extending across the top of the crosshead to the bore 67. The crosshead is also provided with depending lugs 72 spaced sufficiently from the base 73 of the slot 70 to permit the arm 65 to lie in the slots 70 with the portions 74 of the arms behind the lugs 72.

The metallic member 64 is also provided with an aperture 75 in substantial alignment with the bore 67 and this member is also reduced in width as at 76 to fit the width of the slot 70 and groove 71.

It will thus be observed that the links may be secured to the crosshead by passing the metallic member 64 through each link and bending the arms 65 and 66 of this metallic member upward into the slots 70 of the crosshead and into the grooves 71 terminating with a downwardly turned flange 69 in the bore 67. When the spider 64 is secured in this manner with portions 74 behind the lugs 72 on the crosshead, a very firm and permanent mode of attachment is provided thereby.

The improved structure of the crosshead and means for pivotally mounting the links or levers on the crosshead is a very important feature of the present invention. The pivotal mountings of the prior art, which were secured by rivets, were frequently broken during the tamping action on the crosshead, as described in the next paragraph. Such tamping tended to shear the rivets off at the crosshead, and thus resulted in the failure of a number of anchors constructed according to the prior art. The present securing member on the crosshead is reinforced by its securement on both sides of the crosshead and by engagement with the guy rod in such manner that there is no possibility of the pivotal connection being broken by the tamping on the crosshead.

The operation of my expanding anchor is substantially the same as that of those disclosed in the prior patent above mentioned, the anchor being attached to a guy rod by passing the guy rod through the portion of the anchor and securing the nut below the anchor. The anchor may then be inserted in the hole, while the parts are in the position of Fig. 3 and by tamping upon the crosshead, the force will be transmitted through the links to the flukes which will be forced outwardly, cutting into the walls of the hole in the earth. The toggle links not only enable the projection of the flukes, but they reinforce the flukes after they have been projected into engagement with the surrounding earth.

It will thus be observed that I have invented an improved commercial construction of expansion anchor of the class described, in which the anchor is provided with a bottom plate so that the flukes themselves are adapted to slide more readily and the toggle links are secured to the crosshead without the use of rivets.

By means of the housing provided for the flukes, a much more durable construction is provided and the commercial anchor is adapted to be expanded more readily than if the flukes were in direct engagement with the earth below them at the beginning of their expansion.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In an expanding anchor the combination of a bottom plate with means carried by said plate for guiding an anchor fluke, a fluke slidably mounted upon said plate, a crosshead, and a link connecting said crosshead and fluke, said means comprising a housing extending over said fluke.

2. In an expanding anchor the combination of a bottom plate with means carried by said plate for guiding an anchor fluke, a fluke slidably mounted upon said plate, a crosshead, and a link connecting said crosshead and fluke, said means comprising a housing extending over said fluke, and said bottom plate being provided with complementary corrugations.

3. In an expanding anchor the combination of a bottom plate with means carried by said plate for guiding an anchor fluke, a fluke slidably mounted upon said plate, a crosshead, a link connecting said crosshead and fluke, said crosshead comprising a metal member having a notched edge and a sheet metal member passing through said link and having a part receivable in said notch.

4. In an earth anchor, the combination of a bottom plate with a housing member comprising a plate of metal having downwardly extending side flanges, said flanges having portions extending through said bottom plate for retaining said plate and member in assembled relation, flukes slidably mounted in said housing and means for projecting said flukes.

5. In an earth anchor, the combination of a bottom plate with a housing member comprising a piece of metal having downwardly extending flanges, said flanges having portions extending through said bottom plate for retaining said plate and member in assembled relation, flukes slidably mounted in said housing, said flukes and bottom plate being provided with complementary transverse corrugations.

6. In an earth anchor, the combination of a bottom plate with a housing member comprising a piece of metal having downwardly extending flanges, said flanges having portions extending through said bottom plate for retaining said plate and member in assembled relation, flukes slidably mounted in said housing, said flukes and bottom plate being provided with complementary transverse corrugations, a crosshead, and links connecting said crosshead and said flukes.

7. In an earth anchor, the combination of a bottom plate with a housing member comprising a piece of metal having downwardly extending flanges, said flanges having portions extending through said bottom plate for retaining said plate and member in assembled relation, flukes slidably mounted in said housing, said flukes and bottom plate being provided with complementary transverse corrugations, a crosshead, and links connecting said crosshead and said flukes, said links being provided with longitudinally extending pressed ribs.

8. In an earth anchor, the combination of a bottom plate with a housing member comprising a piece of metal having downwardly extending flanges, said flanges having portions extending through said bottom plate for retaining said plate and member in assembled relation, flukes slidably mounted in said housing, said flukes and bottom plate being provided with complementary transverse corrugations, a crosshead, links connecting said crosshead and said flukes, and a sheet metal member having arms extending through said links and clamped upon said crosshead.

9. In an earth anchor, the combination of a bottom plate with a housing member comprising a piece of metal having downwardly extending flanges, said flanges having portions extending through said bottom plate for retaining said plate and member in assembled relation, flukes slidably mounted in said housing, said flukes and bottom plate being provided with complementary transverse corrugations, a crosshead, links connecting said crosshead and said flukes, and a sheet metal member having arms extending through said links and clamped upon said crosshead, said crosshead being provided with a plurality of openings for receiving said arms.

10. In an earth anchor, the combination of a bottom plate with a housing member comprising a piece of metal having downwardly extending flanges, said flanges having portions extending through said bottom plate for retaining said plate and member in assembled relation, flukes slidably mounted in said housing, said flukes and bottom plate being provided with complementary transverse corrugations, a crosshead, links connecting said crosshead and said flukes, and a sheet metal member having arms extending through said links and clamped upon said crosshead, said crosshead being provided with a plurality of openings for receiving said arms, and having shoulders for engagement with the outside of said arms.

11. In an earth anchor, the combination of a crosshead having slots in its sides and downwardly extending lugs at the sides of said slots, with a metal strip for pivotally securing toggle links to said crosshead, said strip being bent about said crosshead within said slots and having laterally projecting portions engaging behind said lugs.

12. In an earth anchor, the combination of a crosshead having slots in its sides, with a metal strip for pivotally securing toggle links to said crosshead, said strip being bent about said crosshead within said slots.

13. In an expanding anchor the combination of a bottom plate with an upper plate fixedly secured to said bottom plate and adapted to guide an anchor fluke, a crosshead adapted to be slidably mounted on a guide rod, a pair of anchor flukes slidably mounted with respect to each other between said plates and a pair of links, each link being pivotally connected to said crosshead and pivotally connected to one of said flukes, whereby said flukes are adapted to be extended by movement of said crosshead on said guide rod.

14. In an expanding anchor the combination of a bottom plate with an upper plate fixedly secured to said bottom plate and adapted to guide an anchor fluke, a crosshead adapted to be slidably mounted on a guide rod, a pair of anchor flukes slidably mounted with respect to each other between said plates and a pair of links, each link being pivotally connected to said crosshead and pivotally connected to one of said flukes, whereby said flukes are adapted to be extended by movement of said crosshead on said guide rod, one of said plates being provided with slots and the other of said plates being formed with a transverse flange having a shoulder for engaging the other plate and with an integral tongue adapted to be secured in said slot.

15. In an earth anchor the combination of a metal crosshead having a centrally located bore for receiving a guy rod with a metal strip adapted to form pivotal supports for pivoted members, said strip being provided with an aperture registering with said bore and being formed with curved portions on both sides of said aperture for pivotally supporting said pivoted members, the ends of said strip being fixedly secured to said metal crosshead.

16. In an earth anchor the combination of a metal crosshead with a metal strip for pivotally securing a plurality of pivoted members to said crosshead, said strip being formed with a body portion located on one side of said crosshead, with attaching end portions secured to said crosshead and intermediate curved portions for pivotal engagement with pivotal members carried by said crosshead.

17. In a device of the class described a metal crosshead comprising a metal member having a centrally located bore with a collar surrounding said bore on one side of said crosshead, a laterally extending flange at the other side of said crosshead, said crosshead being formed with recesses for receiving a securing strip.

18. In a device of the class described the combination of a metal crosshead having a centrally located bore forming a guide for a guy rod, said crosshead being formed with a collar about said guy rod and transversely extending flanges above said collar forming a recess for receiving the end of a pivoted member and a metal strip having its ends secured to the transverse flanges of said crosshead at opposite sides and extending across the bottom of said crosshead over said recesses.

19. In a device of the class described the combination of a metal crosshead having a centrally located bore forming a guide for a guy rod, said crosshead being formed with a collar about said guy rod and transversely extending flanges above said collar forming a recess for receiving the end of a pivoted member, a metal strip having its ends secured to the transverse flanges of said crosshead at opposite sides and extending across the bottom of said crosshead over said recesses, and a pair of pivoted members, each having an aperture in its end and having its end located in said recesses with the strip passing through said apertures to pivotally support said pivoted members on said crosshead.

20. In an earth anchor, the combination of a metal crosshead member, having a centrally located cylindrical bore forming a guide, with a substantially cylindrical metal guy rod extending through said bore and slidably engaging the walls of the bore, a second member pivotally mounted on said crosshead, said member having an aperture adjacent said crosshead, and a metal member extending from one side of said guy rod to the other and having a bore for said guy rod, said bore registering with the bore in said crosshead, said metal member having an arm extending through the aperture in said second pivotally mounted member and the end of said arm being secured to said crosshead.

21. In an earth anchor, the combination of a metal crosshead member, having a centrally located cylindrical bore forming a guide, with a substantially cylindrical metal guy rod extending through said bore and slidably engaging the walls of the bore, a second member pivotally mounted on said crosshead, said member having an aperture adjacent said crosshead, and a metal member extending from one side of said guy rod to the other and having a bore for said guy rod, said bore registering with the bore in said crosshead, said metal member having a pair of oppositely extending arms secured to opposite sides of said crosshead and one of said arms extending through the aperture in the end of said pivotally mounted member.

In witness whereof, I hereunto subscribe my name this 20th day of January, 1932.

ALBERT B. CHANCE.